United States Patent [19]

Tokuda

[11] Patent Number: 5,008,701
[45] Date of Patent: Apr. 16, 1991

[54] PHOTOGRAPHIC PRINTER

[75] Inventor: Kanji Tokuda, Kanagawa, Japan

[73] Assignee: Fuji Photo Film Co., Ltd., Kanagawa, Japan

[21] Appl. No.: 564,516

[22] Filed: Aug. 9, 1990

[30] Foreign Application Priority Data

Aug. 18, 1989 [JP] Japan .................. 1-213704

[51] Int. Cl.⁵ .................................. G03B 27/72
[52] U.S. Cl. ................................. 355/35; 355/52; 355/71
[58] Field of Search .............. 355/35, 52, 67, 71, 355/77; 350/3.76, 431

[56] References Cited

U.S. PATENT DOCUMENTS 3,217,594 11/1965 Simmon ..................... 355/35
4,455,592 6/1984 Martino .................... 350/523 X
4,834,476 5/1989 Benton .................... 350/3.76
4,937,614 6/1990 Tokuda ..................... 355/71 X Primary Examiner—L. T. Hix
Assistant Examiner—D. Rutledge
Attorney, Agent, or Firm—Sughrue, Mion, Zinn, Macpeak & Seas

[57] ABSTRACT

A photographic printer has a film carrier which shifts by 90 degrees in accordance with a frame size of a photographic film. An anisotropic diffusion plate having a light diffusion property only in one direction is attached to the bottom of the film carrier. The anisotropic diffusion plate prevents the quality of photoprints from being degraded by comspicuous scratches on a photographic film which might otherwise be printed on a photographic paper. As the direction of the film carrier is changed in accordance with the frame size, the direction of the anisotropic diffusion plate is changed together with the film carrier.

12 Claims, 6 Drawing Sheets

PHOTOGRAPHIC PRINTER

BACKGROUND OF THE INVENTION

The present invention relates to a photographic printer, and more particularly to a photographic printer in which a film carrier is shifted by 90 degrees in accordance with a film frame size so as to change a direction of transportation of the film.

Along a printing optical path of a photographic printer between a light source and a photographic paper, there are disposed, in order, a mirror box for making uniform the intensity of a printing light, a film carrier for guiding and holding a photographic film, and a printing lens. The mirror box consists of a square shaped, open ended mirror tube with mirrored inner walls and diffusion plates attached to the top and bottom of the mirror tube. A film mask, having an aperture suitable for a frame size of a photographic film is set on the film carrier. For example, for a 135 type photographic film a first film mask formed with a full-size aperture, and a second film mask, formed with a half-size aperture, are formed. There also is a known film mask formed with both full-size and half-size apertures, one of which is set on the printing optical path in accordance with the frame size of a photographic film, e.g. full-size (24×36 mm) and half-size (24×18 mm).

As the frame size is changed from full-size to half-size the direction of the film carrier is shifted by 90 degrees, and the half-size film mask is set thereon. Next, the printing lens is switched to have an enlarged magnification (about two times for the full-size frame). In this condition an image of a half-size picture frame is printed as large as an image of the full-size picture frame on a photographic paper.

As photographic films are transported in a lengthwise direction within a camera and at a photographic processing apparatus (such as a film processor a film inspector, or a photographic printer), the photographic films tend to become scratched in their lengthwise direction. Therefore, it is important for a photographic printer to prevent photoprint quality from being degraded because of such scratches, and also efficiently to utilize light emanated from a light source.

In order to meet the first requirement a photographic printer has been proposed by the present applicant (U.S. patent application Ser. No. 07/356,109, U.S. Pat. No. 4,937,614 filed on May 24, 1989). In this photographic printer an anisotropic diffusion plate having a light diffusion property only in a direction perpendicular to the lengthwise direction of a photographic film, i.e., in the widthwise direction of a photographic film, is mounted between a light source and a photographic film. With this photographic printer, it is necessary to align the light diffusion direction of the anisotropic diffusion plate with the widthwise direction of a photographic film. Accordingly, when the transportation direction of a photographic film is changed by 90 degrees in accordance with a frame size, it is necessary to shift the anisotropic diffusion plate manually by 90 degrees, causing a cumbersome manipulation.

SUMMARY OF THE INVENTION

Therefore it is a principal object of this invention to provide a photographic printer capable of automatically changing the direction of an anisotropic diffusion plate as the transportation direction of a photographic film is changed.

It is another object of this invention to provide a photographic printer capable of using printing light efficiently.

The foregoing and other objects and advantages of this invention are achieved by attaching an anisotropic diffusion plate fixedly to a film carrier on the side of a light source. According to a preferred embodiment of this invention a mirror box is fixed at a film carrier with an anisotropic diffusion plate interposed therebetween, in order to use the printing light efficiently. According to this invention as the direction of the film carrier is shifted by 90 degrees in accordance with a frame size, the anisotropic diffusion plate is shifted automatically by 90 degrees thereby simplifying the manipulation.

BRIEF DESCRIPTION OF THE DRAWINGS

The above objects will become apparent from the following detailed description of the invention when read in conjunction with the accompanying drawings in which.

DETAILED DESCRIPTION OF THE PREFERRED EMBODIMENTS

Figure 1:
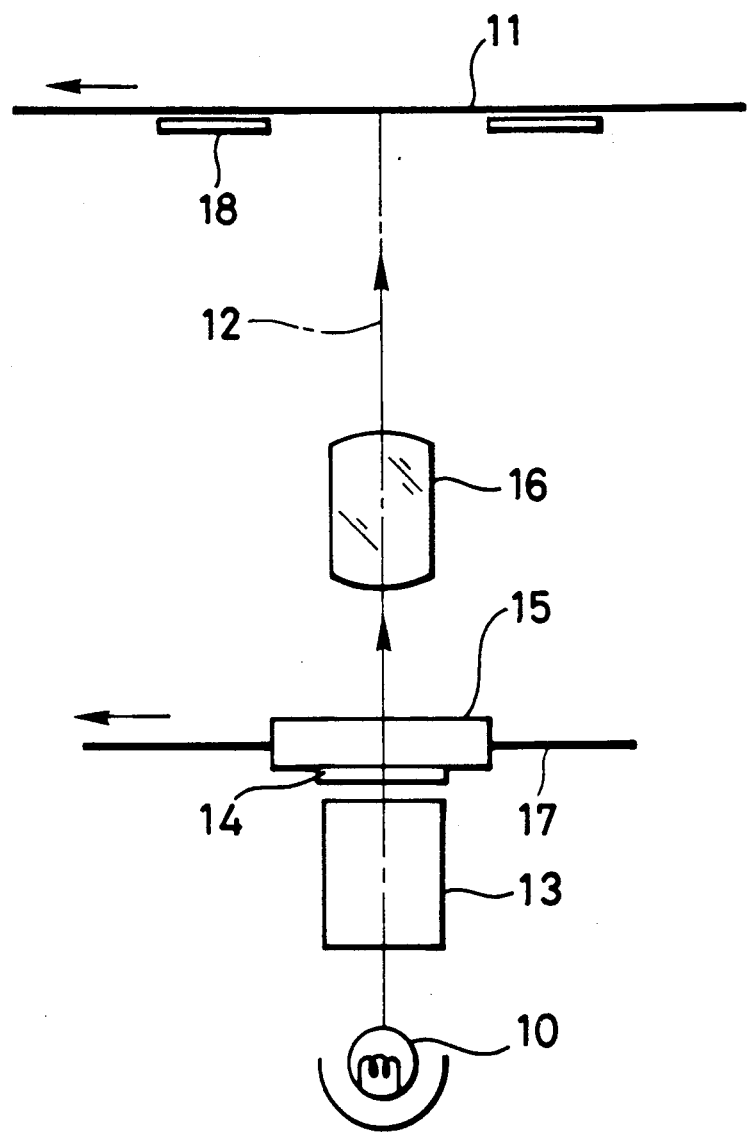
FIG. 1 is a schematic diagram showing an embodiment of a photographic printer of this invention.

Referring to FIG. 1 showing an embodiment of a photographic printer of this invention a mirror box 13, an anisotropic diffusion plate 14 a film carrier 15, and a printing lens 16 are disposed in that order along a printing optical path 12 between a light source 10 and photographic paper 11. Printing light emanated from the light source 10 is diffused by the mirror box 13 and anisotropic diffusion plate 14 and illuminates a photographic film, such as a negative film 17 held by the film carrier 15. An image of a picture frame recorded on the negative film 17 is projected by the printing lens 16 onto the photographic paper 11 within an area defined by a paper mask 18 to create a latent image. A zoom lens is used as the printing lens 16 in this embodiment. Alternatively a plurality of printing lenses having different focal lengths and mounted on a lens turret may be used by selecting one of them suitable for a frame and print size and setting it in the printing optical path.

Figure 2:
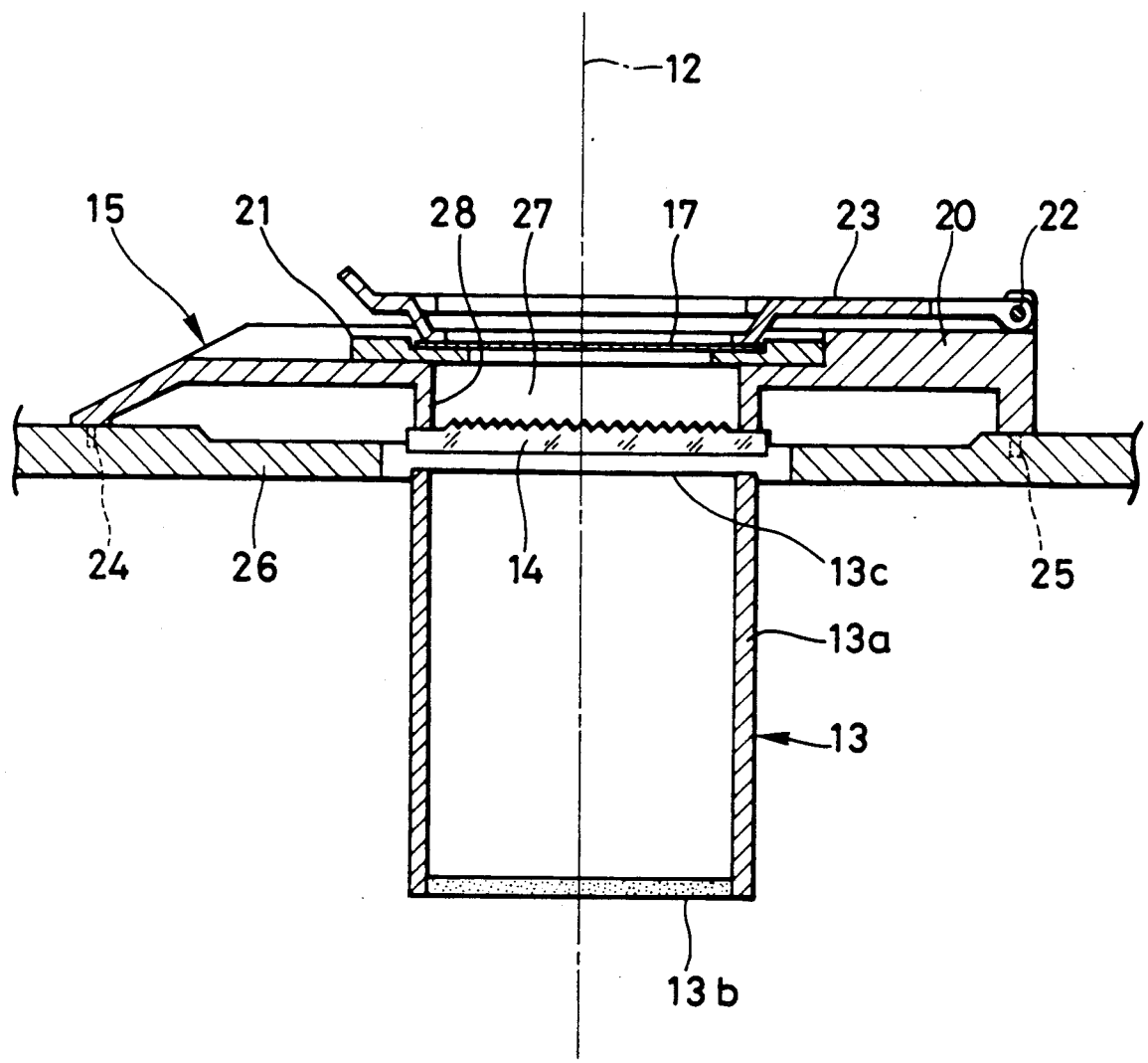
FIG. 2 is a sectional view showing the structure of the film carrier and its peripheral components shown in FIG. 1.

As shown in FIG. 2, the film carrier 15 is constituted by a carrier main body 20, a film mask 21 removably attached to the carrier main body 20, and a pressure plate 23 mounted on the carrier main body 20 by a hinge 22 so as to be lifted up freely. The film carrier 15 is set at one of a plurality of predetermined positions on a printer table 26 by means of positioning pins 24 and 25 formed at the bottom of the carrier main body 20. Film masks are prepared for respective frame sizes, a suitable one being selected for a frame size. During the printing operation the negative film set on the film mask 21 is pressed down by the pressure plate 23 energized by a solenoid (not shown). A bent section 28 is formed at the center of the carrier main body 20 so as to define an aperture 27 to pass a printing light. The anisotropic diffusion plate 14 is fixed at the bottom of the bent section 28 by means of an adhesive agent or the like.

The mirror box 13 consists of a square shaped tube 13a with mirrored inner walls and an isotropic diffusion plate 13b attached to the bottom of the tube 13a. The upper end of the tube 13a is open. The printing light diffused omnidirectionally by the diffusion late 13b is reflected by the inner walls of the tube 13a, and becomes incident on the anisotropic plate 14 via the aperture 13c. The flat diffusion plate 13b may be made of a mild white acrylic plate opal glass plate or the like.

Figure 3:
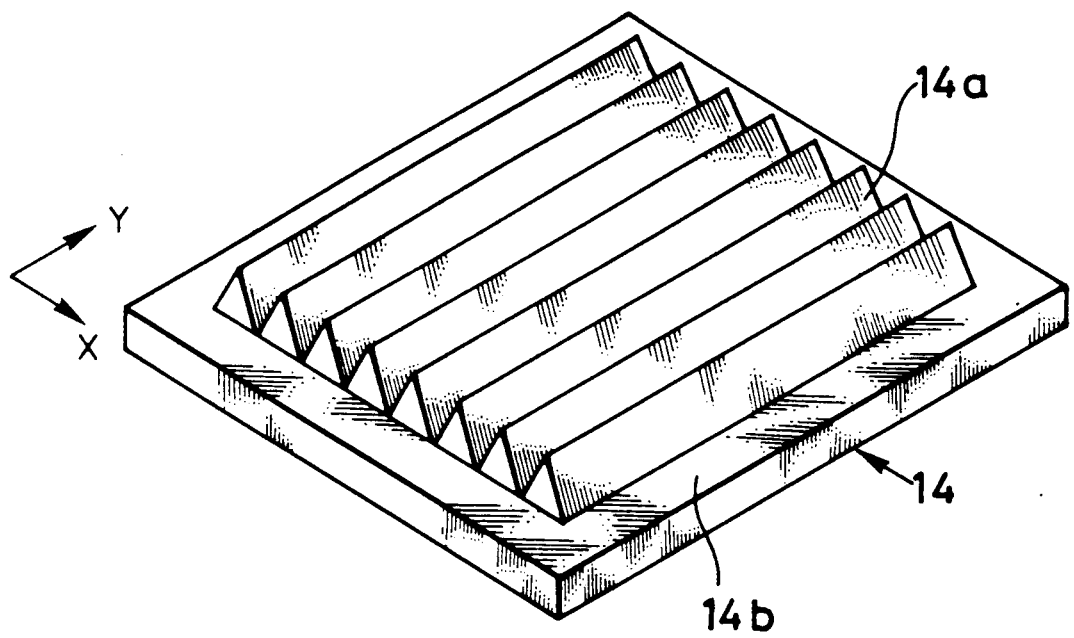
FIG. 3 is a perspective view showing an example of the anisotropic diffusion plate shown in FIG. 2.

As shown in FIG. 3 the anisotropic diffusion plate 14 has a plurality of fine triangularly-shaped ridges 14a disposed on a plate base 14b at regular spacings. The anisotropic diffusion plate 14 is made of transparent glass or plastic, but also may be made of a milk white acrylic plate, opal glass plate or the like. The anisotropic diffusion plate 14 has the light diffusion property only in the X-direction along which the ridges 14a are disposed, but not in the Y-direction perpendicular to the X-direction. The anisotropic diffusion plate 14 is fixed at the carrier main body 20 such that the ridges 14a are aligned substantially parallel to the transportation direction (lengthwise direction) of the negative film 17.

Figure 4:
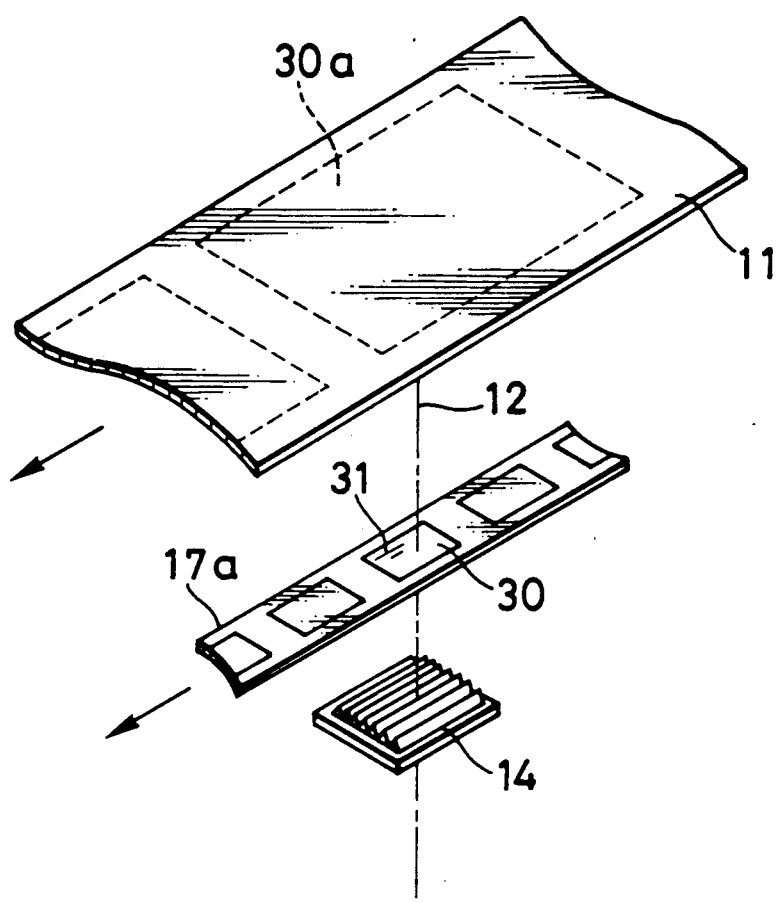
FIGS. 4 and 5 illustrate the relationship between the direction of a photographic film and the direction of an anisotropic diffusion plate.

Next, the operation of the photographic printer of this embodiment will be described with reference to FIGS. 4 and 5. The negative film 17 is set on the printer table 26 while positioning it in the direction determined by the frame size. The positioning pins 24 and 25 are inserted into holes formed in the printer table 26 so that the film carrier 20 is set in position. For instance, if a frame 30 of 135 type full size film (24×36 mm) is to be printed the film carrier 20 is set as shown in FIG. 4, so that the transportation direction of the negative film 14 coincides with that of the photographic paper 11. Next, a 135 type full-size film mask 21 is selected and is set on the film carrier 20. After the negative film 17a is set on the film mask 21, it is pressed down by the pressure plate 23.

Printing light emanated from the light source 10 is diffused to a certain extent by the mirror box 13 and thereafter becomes incident on the anisotropic diffusion plate 14 via the aperture 13c. The printing light incident on the anisotropic diffusion plate 14 is further diffused only in the X-direction along which the ridges 14a are disposed. The printing light passed through the diffusion plate 14 illuminates the frame 30 recorded on a negative film 17a. The frame 30 is projected by the printing lens 16 to the photographic paper 11 to create a latent image 30a. Even if a fine scratch 31 is present in the lengthwise direction of the negative film 17a. the latent image 30a is recorded on the photographic paper 11 while the defect or scratch 31 is made inconspicuous by means of the anisotropic diffusion plate 14. Furthermore, there is decreased loss of light because the printing light is not diffused in the lengthwise direction of the negative film 17a. After printing one frame, the negative film 17a and photographic paper 11 are transported in the direction indicated by an arrow by one frame.

Figure 5:
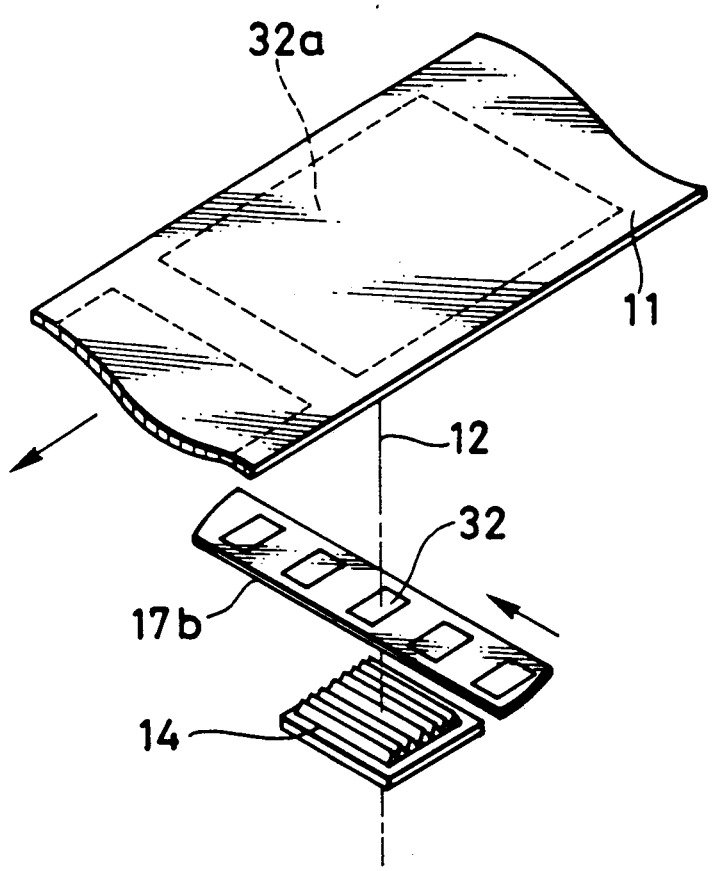

Next, in printing a half-size frame 32 (18×24 mm) film, the transportation direction of a negative film 17b is shifted by 90 degrees as shown in FIG. 5. Specifically, the film carrier 20 is dismounted from the printer table 26, and then it is again set on the printer table 26 after aligning the lengthwise direction of the negative film 17b with the direction perpendicular to the transportation direction of the photographic paper 11. In this case, the anisotropic diffusion plate 14 integrally fixed to the film carrier 20 shifts by 90 degrees as the film carrier 20 shifts, so that the diffusion direction of the anisotropic diffusion plate 14 becomes coincident with the widthwise direction of the negative film 17b. Accordingly it is not necessary to change the direction of the anisotropic diffusion plate 14 manually.

After setting the film carrier 20 a 135 type half-size film mask is placed on the film carrier 20, and the negative film 17b is set on it. Thereafter, the focal length of the printing lens 16 is adjusted so that the print size becomes equal to the 135 type full-size film. In printing, the frame 32 of the negative film 17b is projected by the printing lens 16 to the photographic paper 11 to create a latent image 32a.

Figure 6:
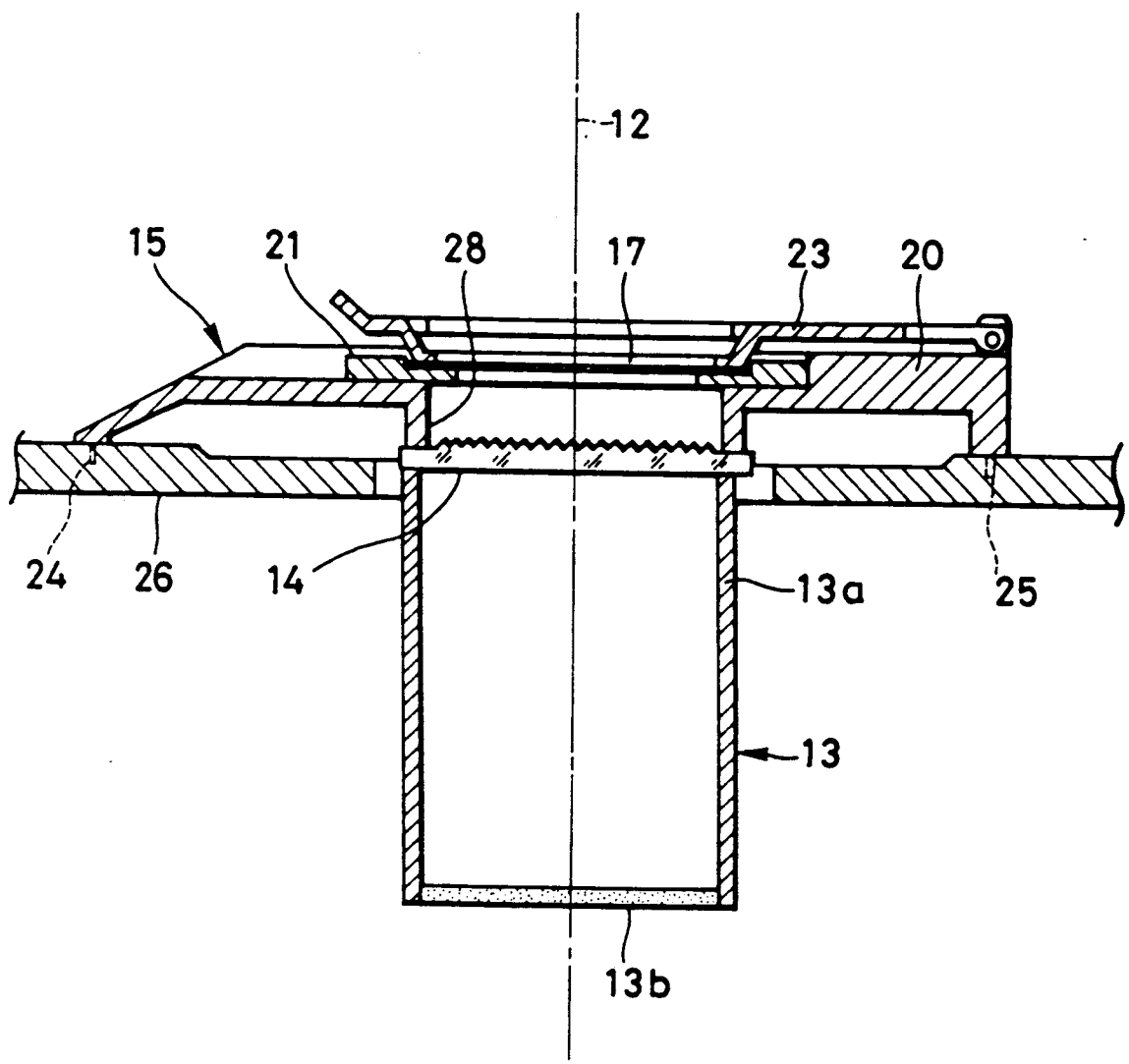
FIG. 6 is a sectional view similar to FIG. 2 showing another embodiment of a photographic printer having a film carrier on which an anisotropic diffusion plate and mirror box are integrally mounted.

Referring to FIG. 6 showing a modification of the present invention, a mirror box 13 is attached to the bottom of an anisotropic diffusion plate 14. In this embodiment, as the direction of the film carrier 20 changes, the anisotropic diffusion plate 14 and mirror box 13 also change their direction. With such an arrangement, there is no gap between the anisotropic diffusion plate 14 and mirror box 13. As a result, no light passes therethrough, thereby allowing efficient use of the printing light. Instead of the isotropic diffusion plate 13b, an anisotropic diffusion plate may be used.

The anisotropic diffusion plate 14 has a number of fine ridges in the above embodiments. A lenticular lens may be used instead as described in the previously cited application. Further the film carrier 20 may be mounted on the print table so as to be rotatable by 90 degrees. Furthermore, this invention is applicable to a condensor type photographic printer using two condensor lenses in place of the mirror box.

Although the present invention has been fully described by way of preferred embodiments thereof with reference to the accompanying drawings, various changes and modifications within the scope and spirit of the invention will be apparent to those skilled in the relevant technical field. Thus the invention should be considered as limited only by the scope of the appended claims.

What is claimed is:

1. A photographic printer comprising:
   a light source for emitting a printing light;
   a film carrier for holding a photographic film to be printed; and
   an anisotropic diffusion plate for diffusing light only in a direction perpendicular to a lengthwise direction of said photographic film, said anisotropic diffusion plate being fixed to said film carrier between said photographic film and said light source.

2. A photographic printer according to claim 1, wherein said anisotropic diffusion plate has a plurality of triangular-shaped ridges formed at regular spacings on the side of said photographic film.

3. A photographic printer according to claim 2, wherein said anisotropic diffusion plate is transparent.

4. A photographic printer according to claim 1, further comprising a mirror box, disposed between said light source and said anisotropic diffusion plate for isotropically diffusing said printing light.

5. A photographic printer according to claim 4. wherein said mirror box comprises a square shaped tube with inner mirrored walls, and an isotropic diffusion plate attached to the bottom of said tube on the side of said light source.

6. A photographic printer according to claim 5, wherein said mirror box is fixed to said anisotropic diffusion plate so that, as said film carrier shifts by 90 degrees in accordance with a frame size of said photographic film, said anisotropic diffusion plate and mirror box also change direction.

7. A photographic printer according to claim 5, wherein said isotropic diffusion plate comprises a mild white acrylic plate.

8. A photographic printer according to claim 5, wherein said isotropic diffusion plate comprises an opal glass plate.

9. A photographic printer according to claim 1, wherein said anisotropic diffusion plate comprises a transparent glass plate.

10. A photographic printer according to claim 1 wherein said anisotropic diffusion plate comprises a plastic plate.

11. A photographic printer according to claim 1, wherein said anisotropic diffusion plate comprises a milk white acrylic plate.

12. A photographic printer according to claim 1, wherein said anisotropic diffusion plate comprises an opal glass plate.

* * * * *